United States Patent
Anton et al.

(10) Patent No.: US 6,818,273 B1
(45) Date of Patent: Nov. 16, 2004

(54) MICROPOROUS HEAT INSULATION BODY

(75) Inventors: Octavian Anton, Brüssel (BE); Ann Opsommer, Koningslo (BE)

(73) Assignee: Promat International N.V., Tisselt (BE)

( * ) Notice: Subject to any disclaimer, the term of this patent is extended or adjusted under 35 U.S.C. 154(b) by 0 days.

(21) Appl. No.: 09/857,182

(22) PCT Filed: Dec. 16, 1999

(86) PCT No.: PCT/EP99/10001

§ 371 (c)(1),
(2), (4) Date: Jun. 19, 2001

(87) PCT Pub. No.: WO00/37388

PCT Pub. Date: Jun. 29, 2000

(30) Foreign Application Priority Data

Dec. 19, 1998 (DE) .......................... 198 59 084
Oct. 16, 1999 (DE) .......................... 199 50 051

(51) Int. Cl.⁷ .............................. B32B 3/02; B32B 1/04; B32B 9/04
(52) U.S. Cl. ............................ 428/68; 428/70; 428/76; 428/454
(58) Field of Search .................. 428/68, 70, 76, 428/454

(56) References Cited

U.S. PATENT DOCUMENTS

| | | | |
|---|---|---|---|
| 3,915,725 A | 10/1975 | Takahashi | |
| 4,359,496 A | * 11/1982 | Kratel et al. | 428/75 |
| 4,381,327 A | * 4/1983 | Briere | 428/137 |
| 4,399,191 A | * 8/1983 | Iwabuchi et al. | 428/336 |
| 4,647,499 A | * 3/1987 | Takahashi et al. | 428/312.6 |
| 4,783,365 A | * 11/1988 | Sklarski et al. | 156/307 |
| 5,399,397 A | 3/1995 | Kollie et al. | |
| 5,556,689 A | * 9/1996 | Kratel et al. | 428/137 |
| 5,631,097 A | * 5/1997 | Andersen et al. | 428/703 |
| 5,741,608 A | * 4/1998 | Kojima et al. | 429/94 |
| 5,989,371 A | * 11/1999 | Nishimoto | 156/73.6 |

FOREIGN PATENT DOCUMENTS

| | | |
|---|---|---|
| DE | 3621705 | 1/1988 |
| DE | 41 06 727 A1 | 9/1992 |
| EP | 0 829 346 A2 | 3/1998 |
| WO | WO 98/26928 | 6/1998 |

* cited by examiner

*Primary Examiner*—Harold Pyon
*Assistant Examiner*—Patricia L. Nordmeyer
(74) *Attorney, Agent, or Firm*—Jacobson Holman PLLC

(57) ABSTRACT

The microporus heat insulation body consists of a core of a compressed heat insulation material containing from 30 to 90% by weight of a finely divided metal oxide and further additives, wherein one or both surfaces thereof have a cover of a heat-resistant material and where the covers are the same or different and at least one side consists of prefabricated mica sheets.

10 Claims, 2 Drawing Sheets

□ REFERENCE EXAMPLE
△ SANDWICH CONTAINING A MICA SHEET OF 0.1 mm

MICROPOROUS HEAT INSULATION BODY

The subject matter of the present invention is a microporous heat insulation body consisting of a core of compressed heat insulation material containing from 30 to 90% by weight of a finely divided metal oxide and further additives, wherein one or both surfaces thereof have a cover from a heat-resistant material.

Heat insulation bodies have been described, e.g., in EP-A-0,618 399, wherein, however, at least one surface of the formed piece is required to have channel pores having pore base areas of from 0.01 to 8 mm$^2$ and penetration depths of from 5 to 100%, based on the thickness of the formed piece, and wherein the surface of the formed piece contains from 0.004 to 10 channel pores per 1 cm$^2$.

Said heat insulation bodies are manufactured by a dry compression and a subsequent sintering at temperatures of from 500 to 900° C. with the channel pores being formed by drilling, punching, or milling and preferably by embossing punches. Due to these measures, it is possible to drain off the steam explosively escaping during the rapid heating such that a decomposition of the heat insulation body can be avoided.

The drawbacks of said heat insulation body are the complicated manufacturing process and the deterioration of the heat insulation properties due to the convection of gases within the pores.

Another process for the manufacturing of a microporous body has been described in EP-A-0 623 567, wherein oxides, hydroxides, and carbonates of the metals of the 2nd main group of the periodic system are compressed together with pyrogenically manufactured SiO$_2$ and optionally Al$_2$O$_3$ and an opacifier and an organic fiber with each other and then sintered at temperatures exceeding 700° C. This process is not only complicated but additionally suffers from the drawback that the re-cooling of this well isolating material takes a long time.

Heat insulation bodies prepared with highly heat-resistant adhesives and a slurry, a silica sol and a clay have been described in DE-C-40 20 771. Herein, also additional prior art regarding the manufacturing and composition of heat insulating bodies has been described. The drawback of all heat insulation bodies comprising organic components and in particular organic fibrous material is that said organic components burn at very high temperatures and feature an unwanted evolution of gas.

DE 41 06 727 describes heat insulation bodies having a plastic sheet cover, wherein special shrinkable plastic sheets are to be used. Also these heat insulation bodies still contain organic material and loose their dimensional stability if heated severely.

DE-C-42 02 569 describes moulds for pressing heat insulation bodies, in particular for electrical radiant heaters such as boiling plates.

EP-A-686 732 describes dry-compressed heat insulation plates consisting of different internal and external materials, said materials having stabilizing openings that throughout consist of the external material. Also these plates can be manufactured only in a complicated manner, and neither the mechanical stability nor heat insulating properties thereof are optimal.

Said heat insulation plates have another drawback in that it is difficult to avoid damaging the outer layers during cutting and processing steps unless very expensive tools such as laser cutters are used since said cutters are capable of vitrifying the freshly formed cut edges.

A process for manufacturing primary crystals of the xonotlite type felted and interlaced with each other and the use thereof have been known from DE 36 21 705. The bubble-shaped particles known up to date having a low density have already been used for manufacturing light weight heat insulation bodies. However, even in the compressed state xonotlite crystals do not have the good thermal insulating properties of dry-compressed metal oxides.

Another attempt to solve the problems in the manufacture of heat insulation plates for obtaining optimal properties has been described in EP 0 829 346, where the difficulties and drawbacks of the state of the art have been listed once again.

An important problem in the manufacture of heat insulation bodies by a dry compressing of the components is that these material tend to resile and to re-expand after compressing such that at least high pressures have to be employed in order to achieve results of some use.

Although the bending strength of said heat insulation plates may be improved by adding fibrous material, higher fiber amounts tend to enhance the delamination and to deteriorate the coherence of the compressed mixture during the critical demolding step.

In any case, the heat insulation plates should not contain organic or combustible components which might result in the evolution of partially also toxic gases during a heating to high temperatures. Finally, it should be possible to process the finished heat insulation bodies easily and without any problems, e.g., it should be possible to saw, cut, or drill said bodies without any problems with no unwanted dust being formed.

Finally, the heat insulation bodies are required to be good electrical insulators in many cases. However, there exist uses where it is desired that at least one of the surfaces has an electrical conductivity to be able to dissipate electrostatic charges.

All these problems have been solved by microporous heat insulation bodies consisting of a compressed heat insulation material containing from 30 to 90% by weight of finely divided metal oxide, from 0 to 30% by weight of an opacifier, from 0 to 10% by weight of an inorganic fibrous material, and from 0 to 15% by weight of an inorganic binder, wherein the body additionally contains from 2 to 45% by weight, preferably from 5 to 15% by weight of xonotlite. Said heat insulation bodies are the subject matter of DE 198 59 084.9.

Figure 1:
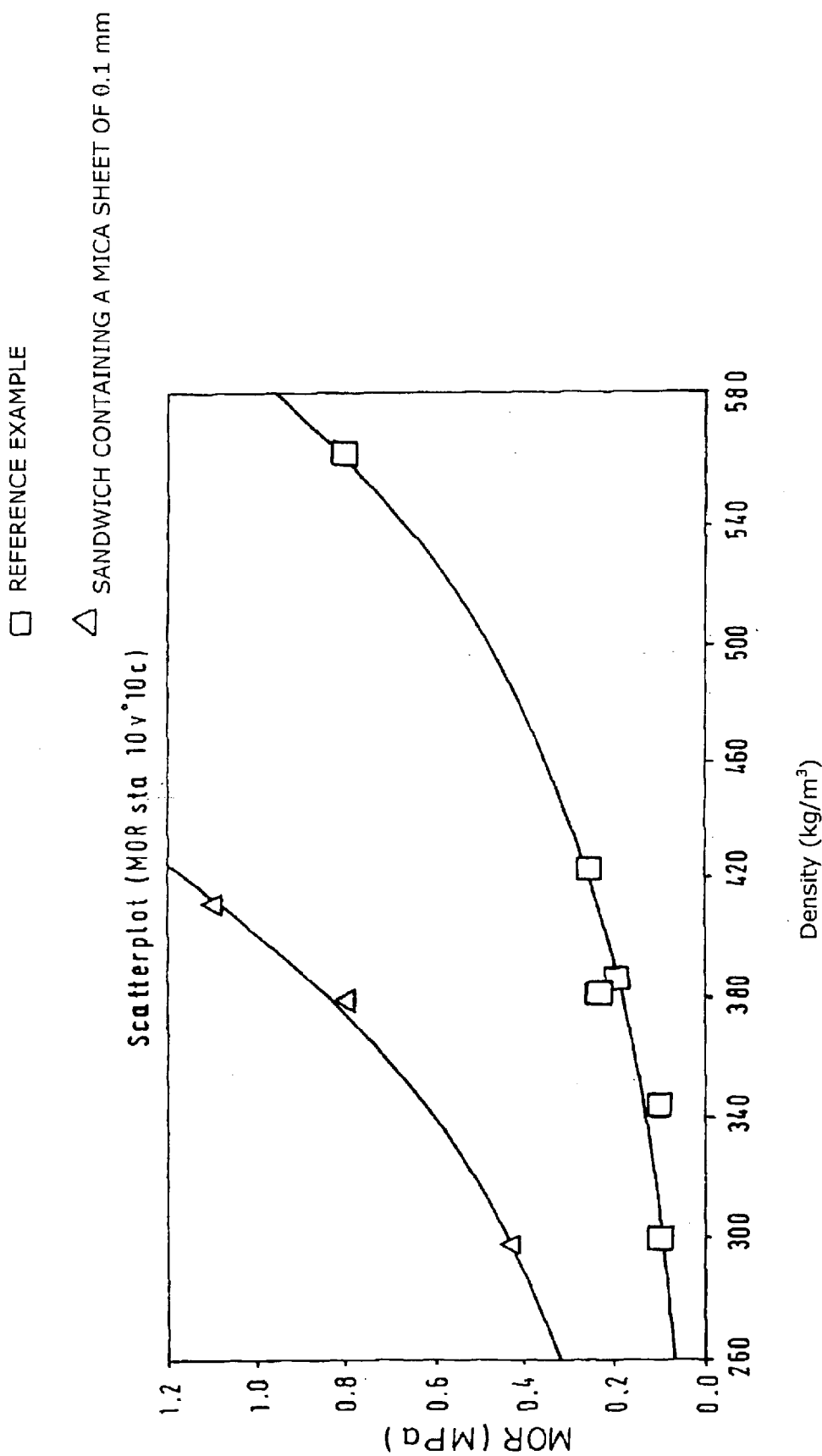
FIG. 1 is a graphic representation of data obtained in accordance with Example 1.

Preferably, said microporous heat insulation body has a cover of a heat-resistant material on one or both surfaces thereof. Especially preferred are covers which are the same or different and consist of rough-pressed xonotlite, prefabricated mica or graphite sheets. With the use of xonotlite and/or mica covers being good electrical insulators are formed. With the use of graphite there is formed a cover which has a conductivity enabling at least the dissipation of electrical charges. Thus, in certain uses it may be advantageous to form one side of the cover from xonotlite and/or mica and the other cover from graphite.

Now, it has been established that covering porous heat insulation bodies with prefabricated mica sheets considerably improves the properties of heat insulation bodies in two different ways, that is, with regard to the thermal conductivity as well as the mechanical properties, in particular the bending strength. At first, this has been established with internal tests of the microporous heat insulation bodies according to DE 198 59 084.9. However, in addition to this it has been established that a covering with prefabricated mica sheets considerably improves other microporous heat insulation bodies as well. Thus, the subject matter of the present invention is a microporous heat insulation body consisting of a core of compressed heat insulation material containing from 30 to 90% by weight of finely divided metal oxide and further additives, wherein one or both surfaces thereof have a cover of a heat-resistant material, characterized in that the covers are the same or different and at least one side consists of prefabricated mica sheets.

Preferably, the cover consists of a prefabricated mica sheet on both sides. The core, in turn, preferably contains from 0 to 30% by weight of an opacifier, from 0 to 10% by weight of a fibrous material, and from 0 to 15% by weight of an inorganic binder with an inorganic fibrous material being preferred.

Above all, the improved mechanical properties become apparent in heat insulation bodies having a distinct flexibility due to the thickness thereof. Thus, heat insulation bodies having a thickness of from 3 to 10 mm, preferably from 5 to 7 mm, are especially preferred.

Moreover, heat insulation bodies wherein the cover is adhered to the core have been proved especially efficient. As adhesives, both inorganic adhesives such as water glass and organic adhesives such as polyvinyl acetate are possible. When heating the finished microporous heat insulation bodies, the low amounts of processed organic substance do practically not impair the properties of said material.

In principle, it is possible to heat-seal the core and the mica sheets together within a film, in particular a shrink film, instead of adhering them. Such microporous heat insulation bodies also have an improved heat insulation, an improved mechanical stability and a better bending strength than the products according to, e.g., EP-A-0 829 346.

The invention will be illustrated in more detail in the following examples and comparative examples.

EXAMPLE 1

A mixture of 63% by weight of pyrogenic silicic acid, 30% by weight of rutile, 2% by weight of silicate fibres (6 mm in length), and 5% by weight of synthetic xonotlite were dry-mixed in a compulsory mixer and then dry-compressed in a metal mould with the pressing pressure varying between 0.9 and 7.0 MPa. This way plates having densities between 300 and 560 kg/m$^3$ were obtained. The bending strength varied between 0.1 MPa and 0.8 MPa as a function of the density. The values are illustrated in FIG. 1.

Furthermore, the lambda values (thermal conductivity in W/(m $°$ K)) as a function of the temperature were determined employing a isolated hot plate according to DIN 52 612.

The above-mentioned plates were coated with a 0.1 mm thick mica sheet on both sides and adhered with a commercial organic adhesive on the basis of PA (polyvinyl acetate). The mica sheets are a commercial product of the Cogebi company, Belgium.

Figure 2:
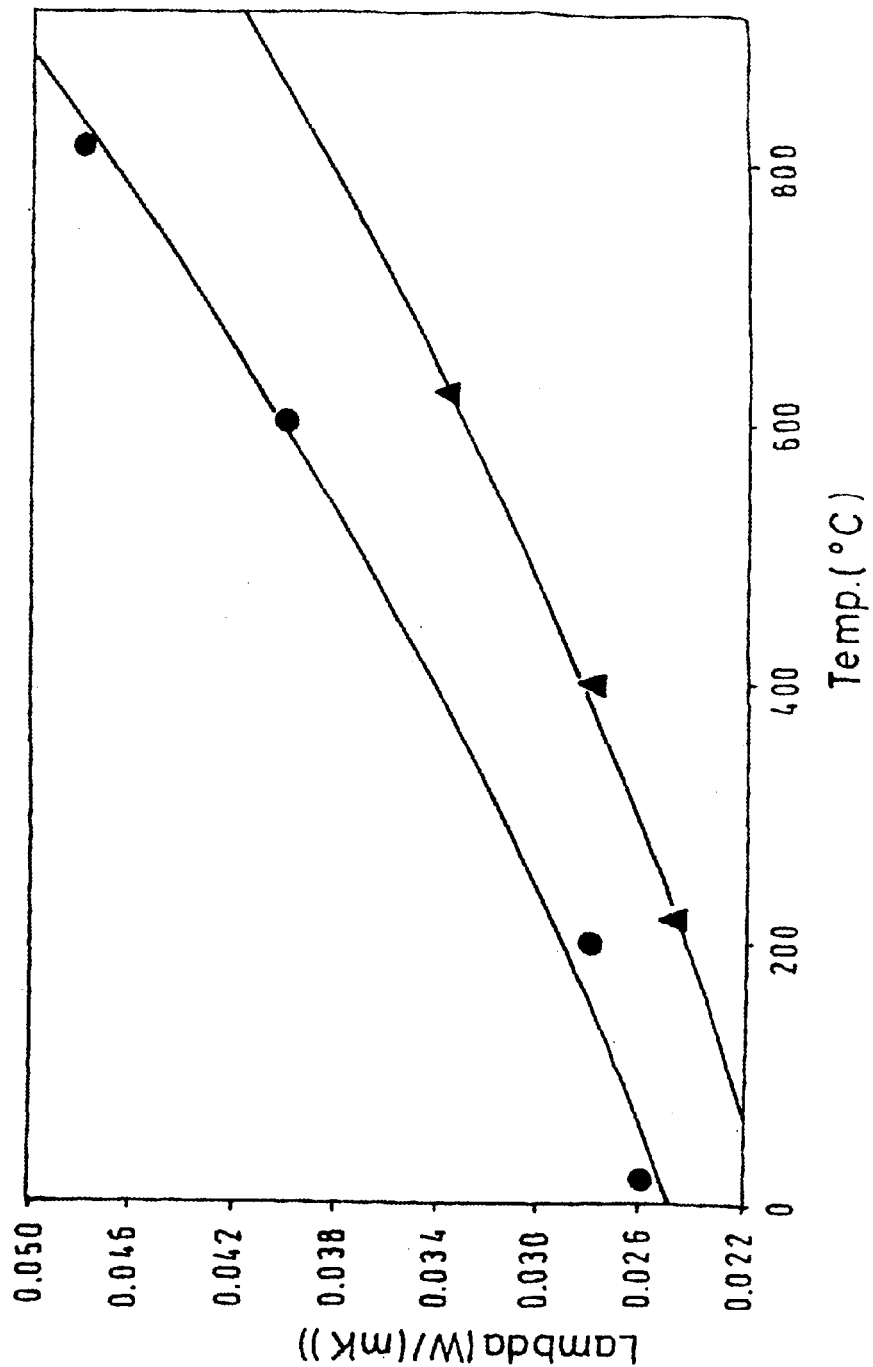
FIG. 2 is a graphic representation of data obtained in accordance with Example 1.

The plates thus obtained were tested for bending strength and thermal conductivity. The results are summarized in the following tables and illustrated in FIGS. 1 and 2.

| Reference example | | Sandwich containing a mica sheet of 0.1 mm | |
|---|---|---|---|
| Density (kg/m$^3$) | Bending strength (MPa) | Density (kg/m$^3$) | Bending strength (MPa) |
| 300 | 0.10 | 298 | 0.43 |
| 387 | 0.19 | 379 | 0.80 |
| 382 | 0.23 | 412 | 1.10 |
| 344 | 0.10 | | |
| 424 | 0.25 | | |
| 560 | 0.80 | | |
| Temperature (° C.) | λ (W/(m ° K) | Temperature (° C.) | λ (W/(m ° K) |
| 20 | 0.026 | 220 | 0.025 |
| 200 | 0.028 | 620 | 0.034 |
| 600 | 0.040 | 400 | 0.028 |
| 800 | 0.048 | | |

What is claimed is:

1. A microporous heat insulation body comprising
   a) a core of compressed heat insulation material containing from 30 to 90% by weight of a finely divided metal oxide and having on one or both surfaces thereof
   b) a cover of a heat-resistant material, characterized in that at least one cover consists of prefabricated mica sheets,
   wherein the microporous heat insulation body does not contain organic components in an amount that impairs the properties of said heat insulation body, and the microporous heat insulation body is stable at 620° C.

2. The microporous heat insulation body according to claim 1, characterized in that both surfaces of the core have covers and both covers consist of prefabricated mica sheets.

3. The microporous heat insulation body according to claim 1, further comprising an opacifier, a fibrous material, or an inorganic binder or a combination thereof.

4. The microporous heat insulation body according to claim 1, further comprising 0 to 30% by weight of an opacifier, 0 to 10% by weight of a fibrous material, and 0 to 15% by weight of an inorganic binder.

5. The microporous heat insulation body according to claim 1, characterized in that the core contains from 2 to 45% by weight of xonotlite.

6. The microporous heat insulation body according to claim 1, characterized in that the core contains from 5 to 15% by weight of xonotlite.

7. The microporous heat insulation body according to claim 1, characterized in that the core has a thickness of from 3 to 10 mm.

8. The microporous heat insulation body according to claim 1, characterized in that the core has a thickness of from 5 to 7 mm.

9. The microporous heat insulation body according to claim 1, characterized in that the cover is adhered to the core.

10. The microporus heat insulation body according to claim 1, characterized in that the core and the cover are heat-sealed within a sheet.

* * * * *